(12) United States Patent
Lee et al.

(10) Patent No.: US 9,331,862 B2
(45) Date of Patent: May 3, 2016

(54) METHODS FOR DETERMINING PROXIMITY OF A MOBILE DEVICE AND AN APPLIANCE AND FOR OPERATING THE SAME

(71) Applicant: General Electric Company, Schenectady, NY (US)

(72) Inventors: Dong Hun Lee, Gunpo-si (KR); Dong Soo Shin, Seoul (KR); Jun Sik Hwang, Seoul (KR); Kihwan Park, Seoul (KR)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 14/073,226

(22) Filed: Nov. 6, 2013

(65) Prior Publication Data

US 2015/0126126 A1 May 7, 2015

(51) Int. Cl.
*H04B 7/00* (2006.01)
*H04L 12/28* (2006.01)
*H04W 4/00* (2009.01)
*H04W 4/02* (2009.01)

(52) U.S. Cl.
CPC ........... *H04L 12/2816* (2013.01); *H04W 4/008* (2013.01); *H04W 4/023* (2013.01); *H04L 2012/285* (2013.01); *H04L 2012/2841* (2013.01)

(58) Field of Classification Search
CPC .................................................. H04L 12/2816
USPC .......................... 455/41.2, 232.1; 340/310.11
See application file for complete search history.

(56) References Cited

U.S. PATENT DOCUMENTS

| | | | |
|---|---|---|---|
| 8,055,230 B1 * | 11/2011 | Bidichandani et al. | 455/232.1 |
| 2008/0180228 A1 * | 7/2008 | Wakefield et al. | 340/310.11 |
| 2012/0249300 A1 | 10/2012 | Avital et al. | |
| 2013/0109404 A1 | 5/2013 | Husney | |
| 2013/0122941 A1 | 5/2013 | Das et al. | |

* cited by examiner

*Primary Examiner* — Hsin-Chun Liao
(74) *Attorney, Agent, or Firm* — Dority & Manning, P.A.

(57) ABSTRACT

A method for determining proximity of a mobile device to an appliance and for operating the appliance and the mobile device is provided. The method includes identifying the mobile device and/or the appliance with a Media Access Control or MAC header and establishing a proximity of the mobile device to the appliance based at least in part on a Received Signal Strength Indicator or RSSI. A service of the appliance can be executed if the RSSI is greater than a threshold value.

7 Claims, 3 Drawing Sheets

METHODS FOR DETERMINING PROXIMITY OF A MOBILE DEVICE AND AN APPLIANCE AND FOR OPERATING THE SAME

FIELD OF THE INVENTION

The present subject matter relates generally to appliances and mobile devices and methods for operating the same.

BACKGROUND OF THE INVENTION

Residential, commercial, and industrial locations can include a variety of appliances. For example, refrigerator appliances, microwave appliances, oven appliances, water heater appliances, HVAC appliances and the like can be provided at such locations. Conventionally, such appliances were stand alone and incapable of communicating with any other device.

More recently, appliances have included network interface devices and microcontrollers or microprocessors that allow the appliances to communicate with one another and other devices over the network. Such communications can facilitate operation of the appliances. However, such communications have been limited.

Thus, methods for detecting proximity of a mobile device and an appliance would be useful. In particular, methods for detecting proximity of a mobile device and an appliance and for operating the appliance and/or the mobile device when the mobile device and appliance are positioned proximate each other would be useful.

BRIEF DESCRIPTION OF THE INVENTION

The present subject matter provides a method for determining proximity of a mobile device to an appliance and for operating the appliance and the mobile device. The method includes identifying the mobile device and/or the appliance with a Media Access Control or MAC header and establishing a proximity of the mobile device to the appliance based at least in part on a Received Signal Strength Indicator or RSSI. A service of the appliance can be executed if the RSSI is greater than a threshold value. Additional aspects and advantages of the invention will be set forth in part in the following description, or may be apparent from the description, or may be learned through practice of the invention.

In a first exemplary embodiment, a method for determining proximity of a mobile device to an appliance and for operating the appliance and the mobile device is provided. The method includes receiving a Media Access Control or MAC header of the appliance at the mobile device, establishing whether a Received Signal Strength Indicator or RSSI of the appliance is greater than a threshold value at the mobile device, requesting a service of the appliance with the mobile device if the RSSI of the appliance is greater than the threshold value at the step of establishing, and executing the service with the appliance.

In a second exemplary embodiment, a method for determining proximity of a mobile device to an appliance and for operating the appliance and the mobile device is provided. The method includes receiving a Media Access Control or MAC header of the mobile device at the appliance, establishing whether a Received Signal Strength Indicator or RSSI of the mobile device is greater than a threshold value at the appliance, executing a service of the appliance with the appliance if the RSSI of the mobile is greater than the threshold value at the step of establishing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
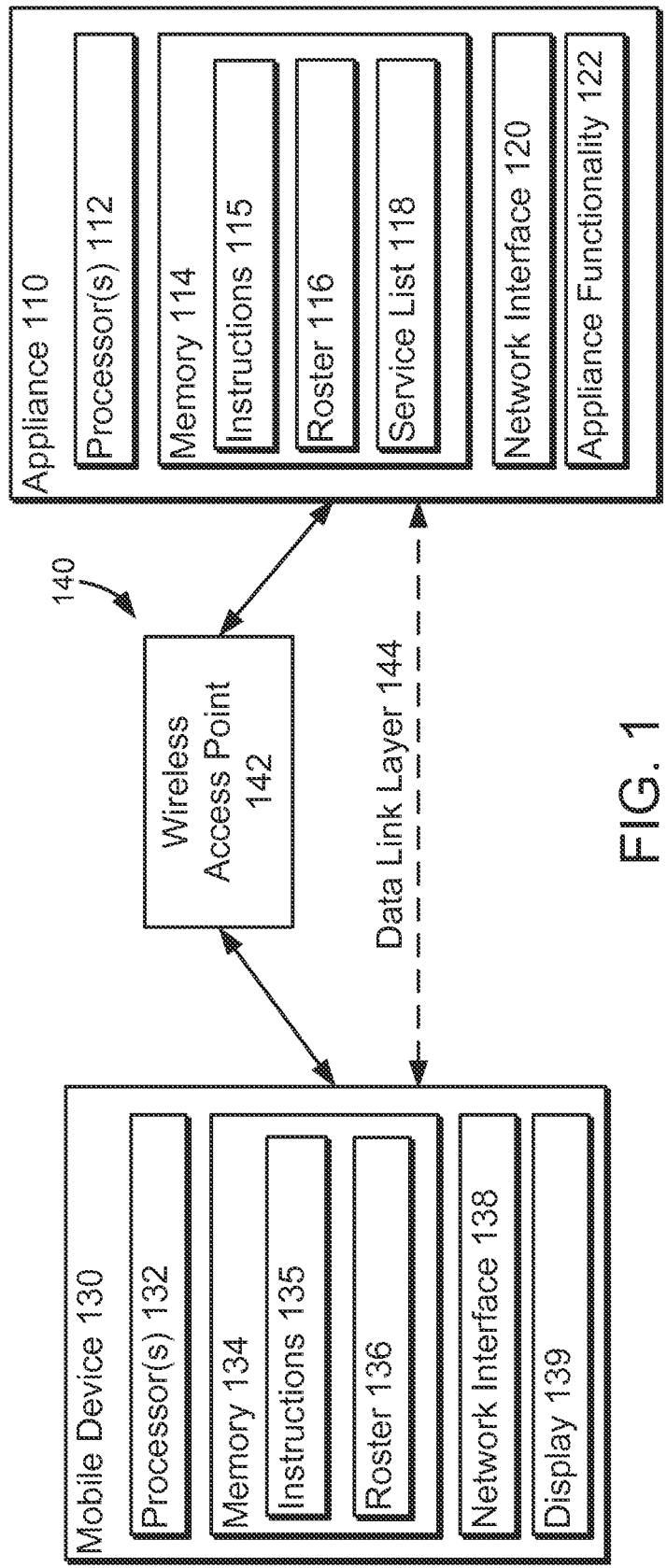
FIG. 1 provides a schematic view of an appliance according to an exemplary embodiment of the present subject matter and a mobile device according to an exemplary embodiment of the present subject matter with the exemplary appliance and the exemplary mobile device being in communication with each other.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of a system 100 for operating an appliance 110 according to an exemplary embodiment of the present subject matter. System 100 includes stations, such as appliance 110 and a mobile device 130. Appliance 110 and mobile device 130 are in communication with one another, e.g., via a network 140. As discussed in greater detail below, system 100 includes features for determining proximity of mobile device 130 relative to appliance 110. When mobile device 130 is positioned proximate appliance 110, system 100 can operate appliance 110 and/or provide information related to appliance 110 to mobile device 130.

Appliance 110 includes one or more processors 112, a memory 114, and a network interface 120, and provides appliance functionality 122. As used herein, an appliance can be any machine or device for performing a specific task, including, without limitation, an air conditioner, an HVAC system controller, a security system, a camera, a ceiling fan, a clothes dryer, a clothes washer, a dishwasher, an energy delivery system, a refrigerator, a heater, a lighting system, a stove, an oven, a smoke detector, a thermostat, a water heater, a humidity or temperature control device, an ice maker, a garbage disposal, a commercial display, a kiosk, a vending machine, a renewable energy system, an energy storage system, a video display appliance (such as a television), an audio emitter appliance (such as a stereo system) or any other suitable appliance.

Network interface 120 of appliance 110 can include any suitable components for interfacing with one more networks, such as network 140. For example, network interface 120 of appliance 110 may include transmitters, receivers, ports, controllers, antennas, or other suitable components.

The processor(s) 112 of appliance 110 can be any suitable processing device, such as a microprocessor, microcontroller, integrated circuit, or other suitable processing device. The memory 114 of appliance 110 can include any suitable computing system or media, including, but not limited to, non-transitory computer-readable media, RAM, ROM, hard drives, flash drives, or other memory devices. The memory 114 of appliance 110 can store information accessible by processor(s) 112 of appliance 110, including instructions 115 that can be executed by processor(s) 112 of appliance 110 to control various components of appliance 110 to provide appliance functionality 122.

Mobile device 130 includes one or more processors 132 and a memory 134. The processor(s) 132 of mobile device 130 can be any suitable processing device, such as a microprocessor, microcontroller, integrated circuit, or other suitable processing device. The memory 134 of mobile device 130 can include any suitable computing system or media, including, but not limited to, non-transitory computer-readable media, RAM, ROM, hard drives, flash drives, or other memory devices. The memory 134 of mobile device 130 can store information accessible by processor(s) 132 of mobile device 130, including instructions 135 that can be executed by processor(s) 132 of mobile device 130 to control various components of mobile device 130. The mobile device 130 can be any suitable type of mobile computing device, such as a general purpose computer, special purpose computer, laptop, integrated circuit, smartphone, tablet, wearable computing device, or other suitable mobile computing device.

Network interface 138 of mobile device 130 can include any suitable components for interfacing with one more networks, such as network 140. For example, network interface 138 of mobile device 130 may include transmitters, receivers, ports, controllers, antennas, or other suitable components.

As discussed above, appliance 110 and mobile device 130 are in communication with one another via network 140. The network 140 can be any type of communications network, such as a local area network (e.g. intranet), wide area network (e.g. Internet), or some combination thereof. The network 140 includes a wireless access point 142 and/or a data link layer 144 for placing appliance 110 and mobile device 130 are in communication with one another. Thus, appliance 110 and mobile device 130 can be in indirect communication with one another via wireless access point 142. Further, appliance 110 and mobile device 130 can be in direct communication with one another via data link layer 144. In general, communication between appliance 110 and mobile device 130 can be carried via associated network interfaces using any type of wireless connection, using a variety of communication protocols (e.g. TCP/IP, HTTP), encodings or formats (e.g. HTML, XML), and/or protection schemes (e.g. VPN, secure HTTP, SSL). In particular, the network 140 may be a wireless local area network (WLAN) configured to conform to IEEE 802.11.

Figure 3:
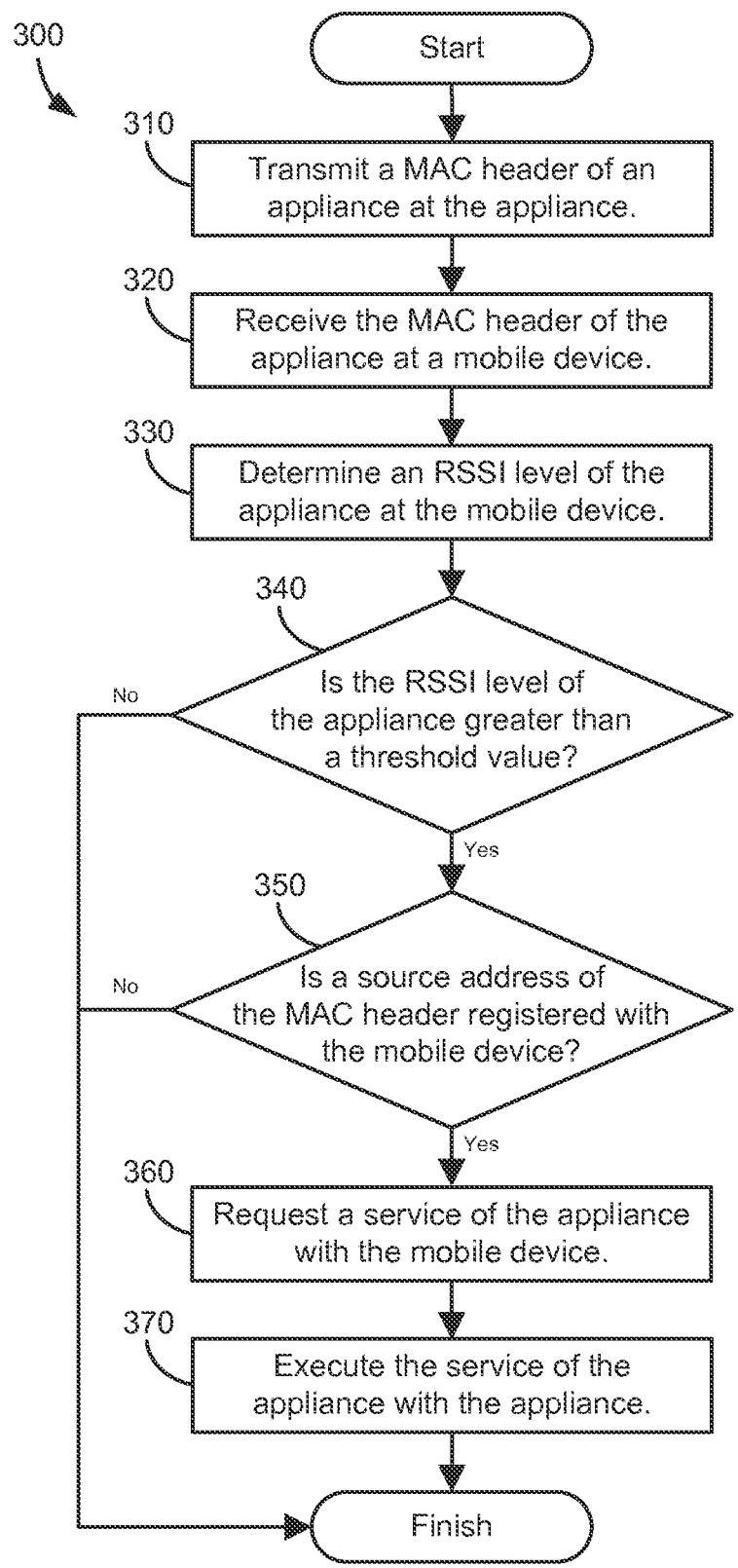
FIG. 3 illustrates a method for determining proximity of a mobile device to an appliance and for operating the appliance and the mobile device according to an exemplary embodiment of the present subject matter.

FIG. 3 illustrates a method 300 for determining proximity of a mobile device and an appliance and for operating the appliance and the mobile device according to an exemplary embodiment of the present subject matter. Method 300 can be used with any suitable appliance and mobile device. For example, method 300 may be used with system 100. In particular, appliance 110 and/or mobile device 130 may be programmed to implement method 300. Utilizing method 300, a proximity of mobile device 130 relative to appliance 110 can be determined, and appliance 110 can be operated or perform a service based upon the proximity of mobile device 130 relative to appliance 110 as discussed in greater detail below.

At step 310, appliance 110 transmits a Media Access Control or MAC header of appliance 110. As an example, appliance 110 can transmit the MAC header of appliance 110 to a router, such as wireless access point 142, at step 310. Alternatively, appliance 110 can, e.g., wirelessly, transmit the MAC header of appliance 110 directly to mobile device 130 via data link layer 144 at step 310.

Figure 2:
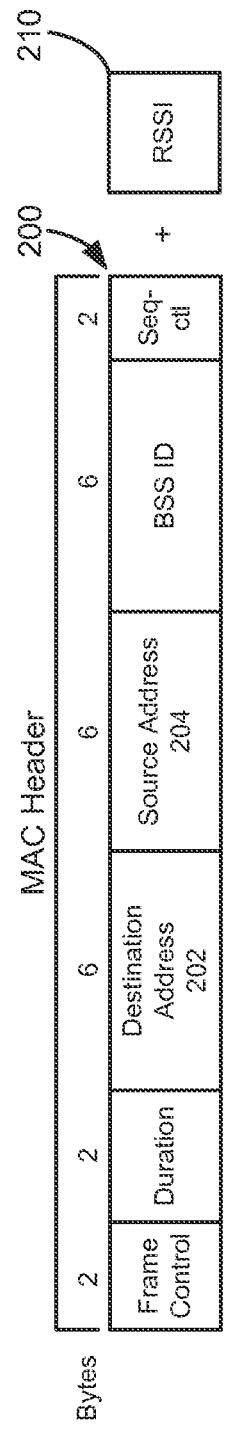
FIG. 2 provides a schematic view of a Media Access Control or MAC header and a Received Signal Strength Indicator or RSSI according to an exemplary embodiment of the present subject matter.

The MAC header of appliance 110 can include various data or information associated with appliance 110. For example, FIG. 2 provides a schematic view of a Media Access Control or MAC header 200 according to an exemplary embodiment of the present subject matter. The MAC header 200 illustrated in FIG. 2 may be substantially similar to the MAC header of appliance 110 transmitted at step 310 of method 300. As may be seen in FIG. 2, MAC header 200 includes a destination address 202 and a source address 204. Destination address 202 can correspond to a destination for a frame associated with MAC header 200. For example, at step 310 in method 300, destination address 202 can correspond to a MAC address of mobile device 130. Source address 204 can correspond to a source of the frame associated with MAC header 200. For example, at step 310 in method 300, source address 204 can correspond to a MAC address of appliance 110.

At step 320, the MAC header of appliance 110 is received at mobile device 130. Mobile device 130 can receive the MAC header of appliance 110 in any suitable manner at step 320. For example, mobile device 130 can receive the MAC header of appliance 110 indirectly from appliance 110 via wireless access point 142 at step 320. As another example, mobile device 130 can receive the MAC header of appliance 110 directly from appliance 110 via data link layer 144 at step 320.

At step 330, a Received Signal Strength Indicator or RSSI of appliance 110 is obtained or determined. In particular, the RSSI of appliance 110 is obtained or determined at mobile device 130 during step 330. The RSSI of appliance 110 can be obtained or determined using any suitable method at step 330. For example, as may be seen in FIG. 2, a Received Signal Strength Indicator or RSSI 210 can be include with the MAC header 200 for each frame associated with the MAC header 200. As will be understood by those skilled in the art, the RSSI 210 can correspond to a power level of a signal from the source associated with source address 202 at the destination associated with destination address 204. Thus, at step 330, the RSSI of appliance 110 can correspond to a power level of a signal from appliance 110 at mobile device 130. In certain exemplary embodiments, the MAC header of appliance 110 that is received at mobile device 130 during step 320 can include the RSSI of appliance 110.

At step 340, it is determined whether the RSSI of appliance 110 is greater than a threshold value at mobile device 130. In certain exemplary embodiments, processor 132 can execute instructions 135 on memory 134 of mobile device 130 that are configured for comparing the RSSI of appliance 110 to the threshold value. If the RSSI of appliance 110 is greater than the threshold value at step 340, it can be inferred that mobile device 130 is located proximate appliance 110. As an example, the RSSI of appliance 110 will increase as a user holding mobile device 130 moves mobile device 130 closer to appliance 110, and it can be inferred that mobile device 130 is located within a certain radius of appliance 110 when the RSSI of appliance 110 exceeds the threshold value. In such a manner, method 300 can assist with determining a proximity mobile device 130 to appliance 110.

If the RSSI of appliance 110 does not exceed the threshold value at step 340, method 300 terminates, e.g., because it can be inferred that mobile device 130 is not located proximate appliance 110. Conversely, method 300 continues to step 350 if the RSSI of appliance 110 exceeds the threshold value at step 340, e.g., because it can be inferred that mobile device 130 is located proximate appliance 110. At step 350, it is determined whether a source address of appliance 110 is registered with mobile device 130. As an example, processor 132 can execute instructions 135 on memory 134 of mobile device 130 that are configured for searching a database or roster 136 in memory 134 of mobile device 130 for the source address of appliance 110. In such example, appliance 110 is registered with mobile device 130 if the source address of appliance 110 is within roster 136, and appliance 110 is not registered with mobile device 130 if the source address of appliance 110 is not within roster 136.

If the source address of appliance 110 is not registered with mobile device 130, method 300 terminates. Conversely, mobile device 130 requests a service of appliance 110 at step 360, e.g., if the RSSI of appliance 110 is greater than the threshold value at step 340 and if the source address of appliance 110 is registered with mobile device 130 at step 350. Thus, mobile device 130 requests the service of appliance 110 at step 360 if mobile device 130 is positioned proximate appliance 110 and appliance 110 is registered with mobile device 130.

At step 370, appliance 110 executes the service. In particular, appliance 110 executes the service if an identity of the service is listed in a service list 118 of appliance 110, e.g., within memory 114 of appliance 110. The service of appliance 110 can be any suitable action. For example, the service may be activating or deactivating appliance 110, e.g., if appliance 110 is an HVAC appliance. As another example, the service may be alerting a user of mobile device 130 that a water filter of appliance 110 needs replacing, e.g., if appliance 110 is a refrigerator appliance. As another example, the service may be alerting the user of mobile device 130 that appliance 110 is activated or hot, e.g., if appliance 110 is a cooktop appliance or an oven appliance. As yet another example, the service may be alerting the user of mobile device 130 that appliance 110 is malfunctioning. It should be understood the examples provided above are not intended to limit the present subject matter and that the service executed by appliance 110 may be any suitable service in alternative exemplary embodiments. In certain exemplary embodiments, appliance 110 sends information to mobile device 130 at step 370. Mobile device 130 can display the information from appliance 110 on a display 139 of mobile device 130. In such a manner, information from appliance 110 can be presented to a user of mobile device 130 on display 139 of mobile device 130.

As discussed above, it is determined whether a source address of appliance 110 is registered with mobile device 130 at step 350. In certain exemplary embodiments, method 300 further includes registering appliance 110 with mobile device 130, e.g., prior to step 310 or step 320. To register appliance 110 with mobile device 130, method 300 can include positioning mobile device 130 proximate appliance 110. In particular, a user can place mobile device 130 proximate appliance 110 such that the RSSI of appliance 110 exceeds the threshold value.

With mobile device 130 positioned proximate appliance 110, mobile device 130 broadcasts a command for appliance 110, and appliance 110 replies to the command. Appliance 110 can send at least one of an appliance type identifier (e.g., whether appliance 110 is a refrigerator appliance, an oven appliance, etc.), an appliance model name, a list of available services and a MAC address of appliance 110 to mobile device 130 when appliance 110 responds to the command from mobile device 130. The user of mobile device 130 can check the information received from appliance 110 and, e.g., select services from the list of services received from appliance 110. Mobile device 130 can store the appliance type identifier, the appliance model name, the list of available services and the MAC address of appliance 110 received from the appliance 110 in memory 134 of mobile device 130. In such a manner, appliance 110 can be registered with mobile device 130.

Figure 4:
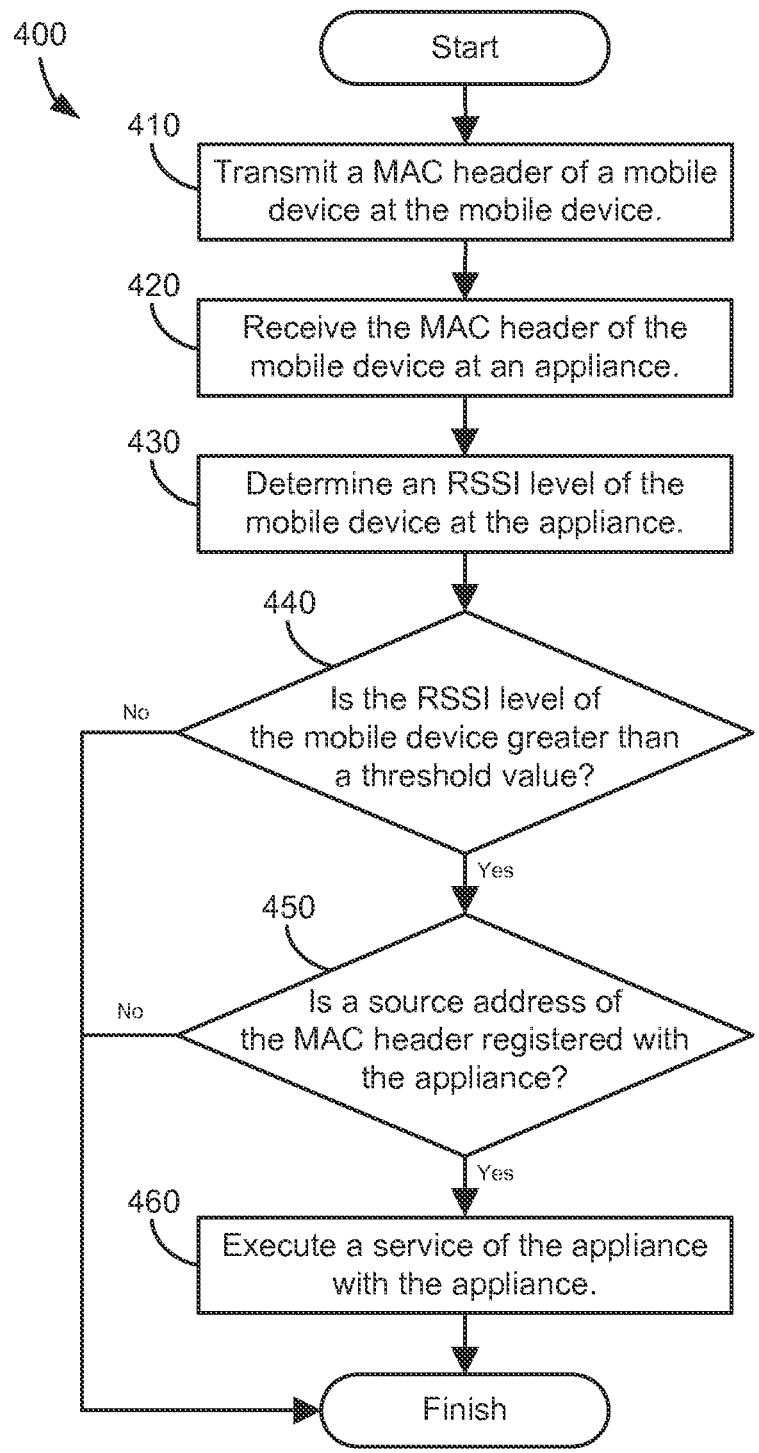
FIG. 4 illustrates a method for determining proximity of a mobile device to an appliance and for operating the appliance and the mobile device according to another exemplary embodiment of the present subject matter.

FIG. 4 illustrates a method 400 for determining proximity of a mobile device and an appliance and for operating the appliance and the mobile device according to an exemplary embodiment of the present subject matter. Method 400 can be used with any suitable appliance and mobile device. For example, method 400 may be used with system 100. In particular, appliance 110 and/or mobile device 130 may be programmed to implement method 400. Utilizing method 400, a proximity of mobile device 130 relative to appliance 110 can be determined, and appliance 110 can be operated or perform a service based upon the proximity of mobile device 130 relative to appliance 110 as discussed in greater detail below.

At step 410, mobile device 130 transmits a Media Access Control or MAC header of mobile device 130. As an example, mobile device 130 can transmit the MAC header of mobile device 130 to a router, such as wireless access point 142, at step 410. Alternatively, mobile device 130 can, e.g., wirelessly, transmit the MAC header of appliance 110 directly to appliance 110 via data link layer 144 at step 410.

As discussed above with respect to the MAC header of appliance 110, the MAC header of mobile device 130 can include various data or information associated with mobile device 130. As an example, the MAC header 200 illustrated in FIG. 2 may be substantially similar to the MAC header of mobile device 130 transmitted at step 410 of method 400. Thus, at step 410, destination address 202 of MAC header 200 can correspond to the MAC address of appliance 110, and source address 204 of MAC header 200 can correspond to the MAC address of mobile device 130.

At step 420, the MAC header of mobile device 130 is received at appliance 110. Appliance 110 can receive the MAC header of mobile device 130 in any suitable manner at step 420. For example, appliance 110 can receive the MAC header of mobile device 130 indirectly from mobile device 130 via wireless access point 142 at step 420. As another example, appliance 110 can receive the MAC header of mobile device 130 directly from mobile device 130 via data link layer 144 at step 420.

At step 430, a Received Signal Strength Indicator or RSSI of mobile device 130 is obtained or determined. In particular, the RSSI of mobile device 130 is obtained or determined at appliance 110 during step 430. The RSSI of mobile device 130 can be obtained or determined using any suitable method at step 430. For example, as may be seen in FIG. 2, RSSI 210 can be include with the MAC header 200 for each frame associated with the MAC header 200. As will be understood by those skilled in the art, the RSSI 210 can correspond to a power level of a signal from the source associated with source address 202 at the destination associated with destination address 204. Thus, the RSSI of mobile device 130 can correspond to a power level of a signal from mobile device 130 at appliance 110. In certain exemplary embodiments, at step 430, the MAC header of mobile device 130 that is received at appliance 110 during step 420 can include the RSSI of mobile device 130.

At step 440, it is determined whether the RSSI of mobile device 130 is greater than a threshold value at appliance 110. In certain exemplary embodiments, processor 112 can execute instructions 115 on memory 114 of appliance 110 that are configured for comparing the RSSI of mobile device 130 to the threshold value. If the RSSI of mobile device 130 is greater than the threshold value at step 440, it can be inferred that mobile device 130 is located proximate appliance 110. As an example, the RSSI of mobile device 130 will increase as a user holding mobile device 130 moves mobile device 130 closer to appliance 110, and it can be inferred that mobile device 130 is located within a certain radius of appliance 110 when the RSSI of mobile device 130 exceeds the threshold value. In such a manner, method 400 can assist with determining a proximity mobile device 130 to appliance 110.

If the RSSI of mobile device 130 does not exceed the threshold value at step 440, method 400 terminates, e.g., because it can be inferred that mobile device 130 is not located proximate appliance 110. Conversely, method 400 continues to step 450 if the RSSI of mobile device 130 exceeds the threshold value at step 440, e.g., because it can be inferred that mobile device 130 is located proximate appliance 110. At step 450, it is determined whether a source address of mobile device 130 is registered with appliance 110. As an example, processor 112 can execute instructions 115 on memory 114 of appliance 110 that are configured for searching a database or roster 116 in memory 114 of appliance 110 for the source address of mobile device 130. In such example, mobile device 130 is registered with appliance 110 if the source address of mobile device 130 is within roster 116, and mobile device 130 is not registered with appliance 110 if the source address of mobile device 130 is not within roster 116.

If the source address of mobile device 130 is not registered with appliance 110, method 400 terminates. Alternatively, appliance 110 executes a service at step 460, e.g., if the RSSI of mobile device 130 is greater than the threshold value at step 440 and if the source address of mobile device 130 is registered with appliance 110 at step 450. Thus, appliance 110 performs or executes the service at step 460 if mobile device 130 is positioned proximate appliance 110 and mobile device 130 is registered with appliance 110.

As discussed above with respect to method 300, the service of appliance 110 can be any suitable action. In certain exemplary embodiments, appliance 110 sends information to mobile device 130 at step 460. Mobile device 130 can display the information on a display 139 of mobile device 130. In such a manner, information from appliance 110 can be presented to a user of mobile device 130 on display 139 of mobile device 130.

As discussed above, it is determined whether a source address of mobile device 130 is registered with appliance 110 at step 450. In certain exemplary embodiments, method 400 further includes registering mobile device 130 with appliance 110, e.g., prior to step 410 or step 420. To register mobile device 130 with appliance 110, method 400 can include positioning mobile device 130 proximate appliance 110. In particular, a user can place mobile device 130 proximate appliance 110 such that the RSSI of mobile device 130 exceeds the threshold value.

With mobile device 130 positioned proximate appliance 110, mobile device 130 broadcasts a MAC address of mobile device 130. In response, appliance 110 can send at least one of an appliance type identifier (e.g., whether appliance 110 is a refrigerator appliance, an oven appliance, etc.), an appliance model name, a list of available services and a MAC address of appliance 110 to mobile device 130. The user of mobile device 130 can check the information received from appliance 110 and, e.g., select services from the list of services received from appliance 110. Mobile device 130 then requests registration of mobile device 130 by appliance 110, and appliance 110 stores a list of selected services and the MAC address of mobile device 130 in the memory 114 of appliance 110. In such a manner, mobile device 130 can be registered with appliance 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining proximity of a mobile device to an appliance and for operating the appliance and the mobile device, comprising:
    broadcasting a command for the appliance with the mobile device via a wireless local area network or WLAN when the mobile device is positioned proximate the appliance;
    in reply to the command, receiving from the appliance an appliance type identifier, an appliance model name, a list of available services and a Media Access Control or MAC address of the appliance at the mobile device via the WLAN; and
    storing the appliance type identifier, the appliance model name, the list of available services and the MAC address of the appliance in a memory of the mobile device;
    receiving a MAC header of the appliance at the mobile device via the WLAN;
    establishing whether a Received Signal Strength Indicator or RSSI of the appliance is greater than a threshold value at the mobile device;
    requesting a service of the appliance with the mobile device via the WLAN if the RSSI of the appliance is greater than the threshold value at said step of establishing; and
    executing the service with the appliance.

2. The method of claim 1, further comprising determining whether a source address of the appliance is registered with the mobile device prior to said step of requesting.

3. The method of claim 2, wherein said step of requesting comprises requesting the service of the appliance with the mobile device if the RSSI of the appliance is greater than the threshold value at said step of establishing and if the source address of the appliance is registered with the mobile device at said step of determining.

4. The method of claim 1, wherein said step of executing comprises sending information from the appliance to the mobile device.

5. The method of claim 4, further comprising displaying the information on a display of the mobile device.

6. The method of claim 1, wherein said step of executing comprises executing the service with the appliance if an identity of the service is listed in a service list of the appliance.

7. The method of claim 1, wherein the appliance is a refrigerator appliance, a washing machine appliance, a dryer appliance, a dishwasher appliance, a microwave appliance, an HVAC appliance, a cooktop appliance, an oven appliance, a video display appliance or an audio emitter appliance.

* * * * *